United States Patent
Takezawa et al.

[11] Patent Number: 5,817,190
[45] Date of Patent: Oct. 6, 1998

[54] FLUX FOR SOFT SOLDERING

[75] Inventors: Hiroaki Takezawa, Nara; Toru Shiino, Moriguchi; Kenichi Nobuta, Ikoma; Hiroshi Onishi, Hirakata, all of Japan

[73] Assignee: Matsushita Electric Industrial Co., Ltd., Osaka-fu, Japan

[21] Appl. No.: 650,747

[22] Filed: May 20, 1996

[30] Foreign Application Priority Data

May 25, 1995 [JP] Japan .................................... 7-126573
Nov. 16, 1995 [JP] Japan .................................... 7-298514

[51] Int. Cl.$^6$ .................................................. B23K 35/34
[52] U.S. Cl. ................................ 148/23; 148/23; 148/24; 148/25
[58] Field of Search ........................ 106/1.13; 228/180.1, 228/214, 223, 224; 148/23, 24, 25

[56] References Cited

U.S. PATENT DOCUMENTS 5,116,432  5/1992  Kerner ........................................ 148/23
5,334,260  8/1994  Stefanowski .............................. 148/23

FOREIGN PATENT DOCUMENTS 6-92038   11/1994  Japan .
7-116889   5/1995  Japan .

OTHER PUBLICATIONS

Kirk–Othmer, "Oxalic Acid", Kirk–Othmer Encyclopedia of Chemical Technology 3rd. ed., V. 16., John Wiley & Sons. 1981 (no month).

*Primary Examiner*—Patrick Ryan
*Assistant Examiner*—M. Alexandra Elve
*Attorney, Agent, or Firm*—Panitch Schwarze Jacobs & Nadel, P.C.

[57] ABSTRACT

A flux for soft soldering is disclosed. It comprises a chelating agent as an activator for facilitating a connection of a conductor metal to a soft solder by removing an oxide film naturally formed on the surface of the conductor metal, and for securing insulating reliability after soft soldering by forming complexes with copper and tin which are insulating substance, and a solvent capable of dissolving the chelating agent and further preferably evaporating at soldering process.

10 Claims, 1 Drawing Sheet

FLUX FOR SOFT SOLDERING

BACKGROUND OF THE INVENTION

1. Field of the Invention

The present invention relates to a flux for soft soldering, used particularly in a process to finish a printed circuit board and the like for electric and electronic components.

2. Description of the Prior Art

Fluxes are regularly used in the process of soft soldering of printed circuit boards for removing oxide films naturally formed on surfaces of electrically conductive metal members.

Conventional fluxes comprise an activator for removing the naturally formed oxide film, a rosin for maintaining reliability after soft soldering, and alcohols as a solvent for the ingredients specified above.

Conventional rosin-containing fluxes usually contain a strong activator such as hydrohalogenic acid salts and the like and, if the activator remains after soft soldering, it imposes an adverse influence on the insulating reliability of the printed circuit board. Therefore, when the conventional rosin-containing fluxes are used, it is necessary to remove residue of the flux on the printed circuit board after soft soldering by washing. In addition to an additional cost for washing, the conventional flux requires a solvent which sometimes causes environmental problem.

Recently, the rosin-containing fluxes which can dispense with washing have therefore been attracting attention in this art. This kind of flux uses a mild organic acid as the activator. The activator remaining on the surface of the printed circuit board after soldering can be trapped by the rosin component, and thus the flux can maintain high insulating reliability even if washing is dispensed with.

However the rosin in the wash-free type rosin-containing fluxes may remain on the surface of the printed circuit board after soft soldering, which sometimes causes a contact failure of checker pins.

As a wash-free flux containing no rosin, there is proposed, for instance, one which uses a water-immiscible solvent such as polyalkylene glycol dialkyl ether or the like which inhibits the moistening property of the residue of the flux on the surfaces after soldering, thereby to secure the insulating reliability of the printed circuit board (Japanese Laid-open Patent Publication No. Hei 3-77,793). Another proposal is the use of a deactivator which reacts with the hydrohalogenic acid salt activator at the temperature of soft soldering and makes the activator harmless, thereby to secure the insulating reliability of the printed circuit board (Japanese Laid-open Patent Publication No. Hei 4-143,093).

The former however has a disadvantage that even if the solvent disappears after soft soldering by decomposing itself, the activator still tends to remain by self-exposure, thereby to sometimes decrease the insulating reliability of the printed circuit board. On the other hand, the latter has a disadvantage that the intended deactivation of the activator proceeds only incompletely when the temperature of the printed circuit board does not rise sufficiently during soft soldering, due to the shape of the components to be soldered and the like, thereby to sometimes decrease the insulating reliability.

As described previously, an addition of the rosin component is indispensable for the conventional wash-free fluxes in order to secure the insulating reliability.

SUMMARY OF THE INVENTION

The primary object of the present invention is to provide a wash-free flux with excellent insulating reliability without the use of the rosin component.

In order to attain the above-mentioned object, the present invention provides a flux for soft soldering comprising a chelating agent capable of forming a stable complex with at least copper and tin.

It is preferable that the flux for soft soldering in accordance with the present invention comprises the above-mentioned chelating agent, and a solvent capable of dissolving the above-mentioned chelating agent and evaporating at the temperature of soldering.

As the above-mentioned chelating agent, it is suitable to employ at least one member selected from the group consisting of oxalic acid, iminodiacetic acid, nitrilotriacetic acid, o-aminobenzoic acid

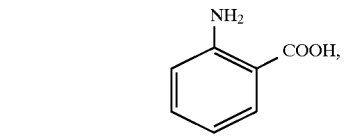

quinoline-2-carboxylic acid

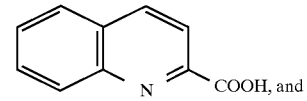

quinoline-8-carboxylic acid

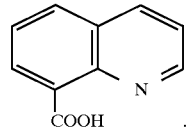

As the above-mentioned chelating agent, one capable of forming a water-insoluble complex with copper and tin is more preferable. As such chelating agent, there is employed at least one member selected from the group consisting of oxalic acid, o-aminobenzoic acid, quinoline-2-carboxylic acid and quinoline-8-carboxylic acid.

A chelating agent having a subliming property is preferable. As such chelating agent, there is employed at least one member selected from the group consisting of oxalic acid, o-aminobenzoic acid and quinoline-8-carboxylic acid.

If a chelating agent having the subliming property is used, it is preferable to combine the chelating agent with a solvent capable of inhibiting the sublimation of the chelating agent. As such a solvent, there is suitably employed at least one member selected from the dihydric alcohols represented by the formula (1) or (2)

$$HO(CH_2CH_2O)_rH \qquad (1)$$

wherein r and s each represent 1 or 2.

If the above-mentioned solvent is used, the chelating agent is preferably a chelating agent capable of forming a stable complex with copper and tin and insoluble in the above-mentioned solvent. As such a chelating agent, at least one member selected from the group consisting of o-aminobenzoic acid, and quinoline-8-carboxylic acid is suitable.

As described previously, the flux for soft soldering in accordance with the present invention comprises the chelating agent capable of forming a complex with at least copper and tin. When this flux is used for soft soldering, tin, which is a main ingredient in a soft solder, forms a complex with the chelating agent after soft soldering and the surface of the soft solder is covered with a film of the complex.

This complex has a chelate structure, and a very strong bonding force is created between the chelating agent and the metal. In particular, the complex of tin formed with one of the oxalic acid, iminodiacetic acid, nitrilotriacetic acid, o-aminobenzoic acid, quinoline-2-carboxylic acid and quinoline-8-carboxylic acid does not dissociate in water, and the film of the thus formed complex demonstrates an excellent insulating reliability on the printed circuit board after soft soldering even without washing. In addition, since a film of the complex is also formed on parts of copper which is also the main ingredient of the conductor metal, no adverse influence is imposed on the parts where no soldering is performed even if the flux is adhered to such parts. Further, since no rosin remains on the surface of the printed circuit board after soft soldering, no contact failure of the checker pin occurs.

If a chelating agent is used which is capable of forming a water-insoluble stable complex with tin and copper, the complex will not be ionized by dissolving in water even under a high humidity condition, and thus the flux demonstrates more excellent insulating reliability.

If the chelating agent capable of forming a stable complex with copper and tin has a subliming property, the chelating agent decomposes with a heat applied during soft soldering and the residue after soft soldering is reduced. Further, if a subliming chelating agent is used, the chelating agent may sometimes decompose before the soft solder spreads completely and causes reoxidation of the circuit board, which results in poor soldering performance. For preventing this, a solvent capable of inhibiting the sublimation of the chelating agent may be added to the solvent as its ingredient, thereby to obtain an excellent soldering performance.

In such a flux that contains a solvent capable of inhibiting the sublimation of the chelating agent, the complex is preferably made not to elute from the flux or its residue even if the solvent remains after soft soldering. This can be accomplished by employing such a chelating agent that forms a stable complex which is not soluble in both of water and the solvent employed for inhibiting the sublimation, and thus the flux can have more excellent insulating reliability than the previously-mentioned flux.

Since a complex of a chelating agent, such as o-aminobenzoic acid or quinoline-8-carboxylic acid, with copper or tin does not dissolve in water and the solvent represented by the above-mentioned formula (1) or (2) which inhibits the sublimation of the chelating agent, the complex does not elute from the flux or its residue even under a high temperature condition or even if the solvent remains on the surface of the printed circuit board after soft soldering, and gives an excellent insulating reliability on the flux.

In addition, as the solvent capable of inhibiting the sublimation of the chelating agent, if an ethylene glycol compounds having an ethylene oxide addition mole number of 3 or more, or a propylene glycol compounds having a propylene oxide addition mole number of 3 or more is used, the solvent does not decompose at the temperature of soft soldering. For this, the solvent remains on the printed circuit board after soft soldering and the board has an adverse problem such as sticky surface.

While the novel features of the present invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
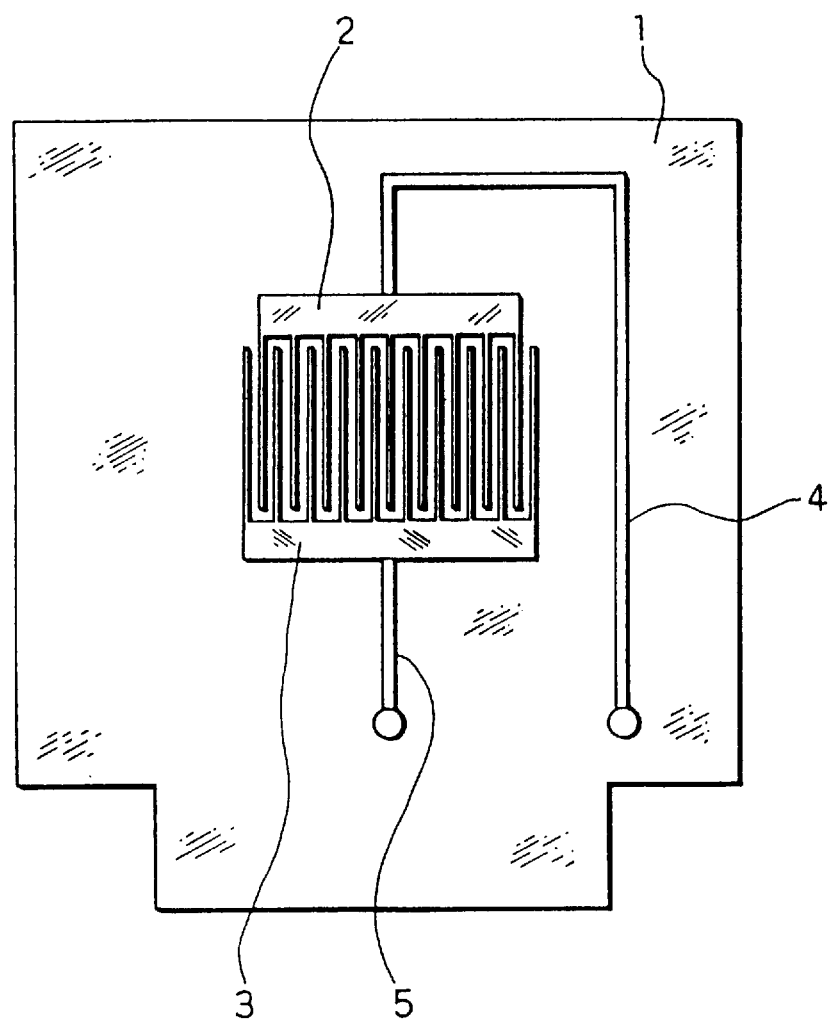
FIG. 1 is a plan view of the printed circuit board used for evaluation of the embodiments of the present invention.

The flux for soft soldering in accordance with the present invention comprises a chelating agent and a solvent capable of dissolving the chelating agent and evaporating at the temperature of soft soldering. It is preferable that the flux contains 3–10 parts by weight of the above-mentioned chelating agent for 100 parts by weight of the above-mentioned solvent.

The chelating agent plays a role as the activator in removing the oxide film naturally formed on the surface of the conductor metal and in facilitating a connection of the conductor metal to the soft solder. It also plays a role in forming a stable complex, which serves an insulator, with the copper present in the conductor metal and with the tin present in the soft solder, thereby to secure the insulating reliability of the printed circuit board after soft soldering.

On the other hand, the solvent plays a role in dissolving the chelating agent and dispersing it in the solvent. It is preferable to use such a solvent that evaporates at the time of soft soldering and does not remain as a residue after soft soldering. The solvents which fulfill such conditions include water, hydrocarbons, ketones, ethers, esters, monohydric alcohols, dihydric alcohols, glycol ethers and the like, which evaporate at the temperature of soft soldering.

If the chelating agent has a subliming property, it is more preferable that the flux contains such a solvent that inhibits the sublimation of the chelating agent. Of 100 parts by weight of the total solvent, 5–50 parts by weight are preferably the solvent capable of inhibiting the sublimation of the chelating agent. The solvents capable of inhibiting the sublimation of the chelating agent include ethylene glycol, diethylene glycol and propylene glycol. Since these glycols do not dissolve a complex of o-aminobenzoic acid or quinoline-8-caboxylic acid formed with copper or tin, it is preferable to configure the flux by combining the glycols with these chelating agents.

If a flux configured by employing the o-aminobenzoic acid as the chelating agent and a solvent only selected from the group consisting of ethylene glycol, diethylene glycol and propylene glycol is used for soft soldering, the solvent does not evaporate at the time of soldering and remains as a residue after soldering. For this, it is more preferable to use such a solvent wherein 50–95 parts by weight in 100 parts by weight of the glycols are replaced with a low boiling point solvent. The low boiling point solvents include water, hydrocarbons, ketones, ethers, esters, monohydric alcohols, glycol ethers which evaporate at the temperature applied during soft soldering.

In the case of configuring a flux with a chelating agent and a solvent, if the amount of the chelating agent is less than 3 parts by weight for 100 parts by weight of the solvent, the flux cannot completely remove the oxide film naturally formed on the surface of the conductor metal and demonstrates an inferior soldering performance. If the amount of the chelating agent is over 10 parts by weight, 15 parts by weight or more in particular, it is too excessive for removing the naturally formed oxide film, and a large amount of the chelating agent remains without forming a complex with a metal after soft soldering and leaves a large amount of residue. From these facts, it is concluded that the amount of the chelating agent is preferably 3–10 parts by weight for 100 parts by weight of the total solvent.

The flux for soft soldering in accordance with the present invention may include solid matters such as rosin, synthetic resin and the like, in addition to the above-specified components of the chelating agent and the solvent. These solid matters are likely to remain on the printed circuit board after soft soldering and sometimes cause a contact failure of the checker pin. In order to prevent the contact failure of the checker pin as much as possible, it is desirable that the flux contains the solid matter 10 parts by weight or less for the total 100 parts by weight of the solvent and the chelating agent.

In the following paragraphs, the present invention will be described more specifically with reference to specific examples.

First, the fluxes of the compositions as listed in Table 1 below were prepared by placing the respective flux components in a glass beaker of 300 ml volume and stirring. Next, the performances of the fluxes were evaluated in accordance with Experiment 1 through Experiment 3 below. The results of evaluations are also summarized in Table 1 below together with the compositions of the fluxes.

EXPERIMENT 1

For Evaluating Soft Soldering Performance

Soft solder spreading rates were measured according to a method specified in JIS Z 3197, and measurement results were evaluated according to the criteria for evaluating the soft soldering spreading rate and graded and symbolized as follows:

◎: 90% or more
○: 85% or more but less than 90%
Δ: 80% or more but less than 85%
x: less than 80%

EXPERIMENT 2

For Evaluating the Residue of the Flux

Each of the fluxes was uniformly coated on a part of the comb-shaped electrodes 2 and 3 (JIS Type II) of a printed circuit board for evaluation 1 shown in FIG. 1, and soft soldering was performed twice on the board by dipping it in a soft soldering bath kept at 240° C. for 3 seconds. Next, the residue of the flux remaining on the surface of the board after soft soldering was evaluated macroscopically. In FIG. 1, numerals 4 and 5 indicate lead wires for the electrodes 2 and 3, respectively.

Criteria for Evaluation:
◎: Complete absence of residue
○: Rare residue
Δ: Presence of residue

EXPERIMENT 3

For Evaluating the Insulating Reliability

Each of the printed circuit boards used in Experiment 2 was placed in a thermostat kept at 60° C. and 95% RH, and an insulating resistance test was performed for each board in a state where a d.c. voltage of 50 V was applied across the electrodes 2 and 3 for 1,000 hours. The insulating resistances of the board were measured at 60° C. and 95% RH, once per hour during the test. Sequential changes in the insulating resistance were evaluated according to the criteria for evaluation and graded and symbolized as follows:

◎: $10^{10}\Omega$ or higher constantly
○: a decrease to $10^{9}\Omega$ or higher but lower than $10^{10}\Omega$
Δ: a decrease to $10^{8}\Omega$ or higher but lower than $10^{9}\Omega$
x: a decrease to lower than $10^{8}\Omega$

TABLE 1

| Item | Composition of Flux (parts by weight) | | Result of Evaluation Evaluation | | |
|---|---|---|---|---|---|
| | Chelating agent | Solvent | 1 | 2 | 3 |
| Example 1 | Iminodiacetic acid (3) | IPA*(100) | ◎ | ○ | ○ |
| Comparative Example 1 | Sebacic acid (3) | IPA (100) | ◎ | ○ | x |
| Example 2 | Quinoline-2-carboxylic acid (3) | IPA (100) | ◎ | ○ | ◎ |
| Example 3 | Oxalic acid (3) | IPA (100) | ○ | ◎ | ◎ |
| Example 4 | Oxalic acid (3) | DEG** (100) | ◎ | ○ | ○ |
| Comparative Example 2 | Oxalic acid (3) | TEG*** (100) | ◎ | x | ○ |
| Example 5 | o-aminobenzoic acid (3) | DEG (100) | ◎ | ○ | ◎ |
| Example 6 | o-aminobenzoic acid (3) | DEG(5) + IPA(95) | ◎ | ◎ | ◎ |

*IPA: Isopropyl alcohol
**DEG: Diethylene glycol
***TEG: Triethylene glycol
Evaluation 1: Soft soldering performance
Evaluation 2: Residue of the flux
Evaluation 3: Insulating reliability

EXAMPLE 1

Iminodiacetic acid and isopropyl alcohol were used as the chelating agent and the solvent, respectively. As clearly shown in Table 1, the obtained flux has excellent soft soldering performance and insulating reliability, and is less likely to leave any residue after soft soldering.

A similar technical advantage was obtained with nitrilotriacetic acid in place of iminodiacetic acid as the chelating agent.

As described above, when a chelating agent capable of forming a stable complex with at least tin and copper is employed, a flux with excellent soft soldering performance and insulating reliability is obtained.

By contrast, the flux in accordance with Comparative Example 1 which employs, in place of iminodiacetic acid, sebacic acid being hardly capable of forming a complex with tin and copper has poor insulating reliability compared to that of Example 1.

EXAMPLE 2

Quinoline-2-carboxylic acid was used as the chelating agent. Since the quinoline-2-carboxylic acid forms a water-insoluble complex with either copper or tin, it gives more excellent insulating reliability than that of Example 1.

EXAMPLE 3

Oxalic acid was used as the chelating agent in this example. Since the oxalic acid forms a water-insoluble complex with either copper or tin, it gives more excellent insulating reliability than that of Example 1. In addition to this, since the oxalic acid has a subliming property, it decomposes with the heat applied at the time of soft soldering and does not remain on the surface of the printed circuit board after soft soldering. Therefore, the flux leaves less residue than that of Example 2.

EXAMPLE 4

In this example, oxalic acid and diethylene glycol were used as the chelating agent and the solvent, respectively. Since the ethylene glycol inhibits the sublimation of the oxalic acid, the flux has more excellent soft soldering performance than that of Example 3. The complex of the oxalic acid formed with tin and copper is insoluble in water and soluble in ethylene glycol, and thus the insulating reliability of the obtained flux is inferior to that of Example 3. Moreover, since the ethylene glycol having a high boiling point is used as the solvent, the obtained flux leaves more residue on the surface of the printed circuit board after soft soldering than that of Example 3.

In Comparative Example 2, triethylene glycol was used as the solvent in place of the diethylene glycol. Since the triethylene glycol does not decompose at the temperature of soft soldering, the flux leaves a large amount of the residual solvent after soft soldering and causes an adverse problem such as sticky surface of the board.

EXAMPLE 5

A flux consisting of o-aminobenzoic acid and diethylene glycol is disclosed in this example. Although the o-aminobenzoic acid is a chelating agent having a subliming property, it gives a flux having a favorable soft soldering performance by binding it with diethylene glycol, which is a solvent capable of inhibiting the sublimation of the o-aminobenzoic acid. Further, since the complex of the o-aminobenzoic acid formed with either copper or tin does not dissolve in both of water and diethylene glycol, it gives more excellent insulating reliability than that of Example 4.

A similar technical advantage was obtained with a flux prepared by employing, in place of the o-aminobenzoic acid, quinoline-8-carboxylic acid, which has a subliming property similar to the o-aminobenzoic acid and capable of forming a complex insoluble in both of water and diethylene glycol with either tin or copper.

EXAMPLE 6

In this example, a part of diethylene glycol in the flux composition of Example 5 was replaced with isopropyl alcohol. The obtained flux leaves less residue of the solvent after soft soldering than that of Example 5. The soft soldering performance and the insulating reliability of the obtained flux are equivalent to those of Example 5.

Next, a test on the conductivity by the checker pins for the part of the comb-shaped electrodes of 50 sheets of the printed circuit boards after soft soldering, showed no contact failure.

Although isopropyl alcohol was used as a solvent for substituting the part of the diethylene glycol in Example 6, a similar technical advantage was obtained with a flux prepared by employing different solvent which evaporates at the temperature of soft soldering and does not dissolve the complex, for instance, other monohydric alcohols, water, hydrocarbons, ketones or the like.

Moreover, although the o-aminobenzoic acid was used as the chelating agent, a similar technical advantage was obtained with a flux prepared by employing quinoline-8-carboxylic acid, a chelating agent having a subliming property similar to that of the o-aminobenzoic acid and capable of forming a complex with either copper or tin being insoluble in both of water and the solvent for inhibiting the sublimation of the chelating agent.

As previously described in Example 1 through Example 6, the flux for soft soldering in accordance with the present invention has excellent soft soldering performance and insulating reliability, is less likely to leave a residue after soft soldering, and contains no solid matter such as rosin or the like. This prevents contact failure of the checker pin. Among these, the flux in accordance with Example 6 has the most excellent performance as the flux.

In addition, since the flux for soft soldering in accordance with the present invention contains water as main ingredient of the solvent, it can comply with any rules and regulations stipulated for controlling volatile solvents and the like. Further, the chelating agent used to prepare the flux in accordance with the present invention is capable of forming a complex with any metal employed in the soft solder and thus can also be applied to a lead-free solder.

As described previously, the present invention provides a flux excellent in the soft soldering performance and insulating reliability, and free from the contact failure of the checker pin. In addition, since the flux in accordance with the present invention can dispense with washing after soft soldering, it is possible to greatly reduce the cost of washing in the manufacturing process of the printed circuit boards.

Although the present invention has been described in terms of the presently preferred embodiments, it is to be understood that such disclosure is not to be interpreted as limiting. Various alterations and modifications will no doubt become apparent to and can be readily made by those skilled in the art without departing from the scope and spirit of the present invention. Accordingly, it is intended that the appended claims be construed and interpreted as covering all alterations and modifications as fall within the true spirit and scope of the invention.

What is claimed is:

1. A flux for soft soldering comprising a chelating agent capable of forming a stable complex with at least copper and tin, and a solvent capable of dissolving said chelating agent and evaporating at a temperature of a soldering process, said chelating agent being at least one member selected from the group consisting of iminodiacetic acid, nitrilotriacetic acid, quinoline-2-carboxylic acid, and quinoline-8-carboxylic acid.

2. The flux for soft soldering in accordance with claim 1, which contains 3–10 parts by weight of said chelating agent for 100 parts by weight of said solvent.

3. A flux for soft soldering comprising a chelating agent capable of forming a water-insoluble and stable complex with at least copper and tin, and a solvent capable of dissolving said chelating agent and evaporating at a temperature of a soldering process, said chelating agent being at least one of quinoline-2-carboxylic acid, and quinoline-8-carboxylic acid.

4. The flux for soft soldering in accordance with claim 3, which contains 3–10 parts by weight of said chelating agent for 100 parts by weight of said solvent.

5. The flux for soft soldering in accordance with claim 2, wherein 5–50 parts by weight of 100 parts by weight of said solvent is a solvent capable of inhibiting a sublimation of said chelating agent.

6. The flux for soft soldering in accordance with claim 5, wherein 5–50 parts by weight of 100 parts by weight of said solvent is a solvent capable of inhibiting a sublimation of said chelating agent.

7. The flux for soft soldering in accordance with claim 5, wherein said solvent capable of inhibiting a sublimation of said chelating agent is at least one member selected from dihydric alcohols represented by the formula (1) or (2)

$$HO(CH_2CH_2O)_rH \quad (1)$$

$$HO(CHCH_2O)_sH\;\;\underset{|}{\overset{CH_3}{}} \quad (2)$$

wherein, r and s each represent 1 or 2.

8. The flux for soft soldering in accordance with claim 6, wherein said solvent capable of inhibiting a sublimation of said chelating agent is at least one member selected from dihydric alcohols represented by the formula (1) or (2)

$$HO(CH_2CH_2O)_rH \quad (1)$$

$$HO(CHCH_2O)_sH\;\;\underset{|}{\overset{CH_3}{}} \quad (2)$$

wherein, r and s each represent 1 or 2.

9. The flux for soft soldering in accordance with claim 7, wherein said chelating agent is capable of forming a stable complex with at least copper and tin, which is insoluble in both of water and said solvent.

10. The flux for soft soldering in accordance with claim 8, wherein said chelating agent is capable of forming a stable complex with at least copper and tin, which is insoluble in both of water and said solvent.

* * * * *